US011959532B2

United States Patent
Wu (10) Patent No.: US 11,959,532 B2
(45) Date of Patent: Apr. 16, 2024

(54) ONE-WAY POWER CONVERSION DEVICE AND POWER SYSTEM HAVING SAME

(71) Applicant: XIAMEN CHUANGLIU TECHNOLOGY CO., LTD., Xiamen (CN)

(72) Inventor: Qinfa Wu, Zhangzhou (CN)

(73) Assignee: XIAMEN CHUANGLIU TECHNOLOGY CO., LTD., Xiamen (CN)

( * ) Notice: Subject to any disclaimer, the term of this patent is extended or adjusted under 35 U.S.C. 154(b) by 197 days.

(21) Appl. No.: 17/537,528

(22) Filed: Nov. 30, 2021

(65) Prior Publication Data
US 2022/0099163 A1 Mar. 31, 2022

Related U.S. Application Data

(63) Continuation of application No. PCT/CN2019/100389, filed on Aug. 13, 2019.

(30) Foreign Application Priority Data

Jun. 15, 2019 (CN) .......................... 201910518244.1
Aug. 6, 2019 (CN) .......................... 201910719082.8

(51) Int. Cl.
*F16H 3/10* (2006.01)
*F03B 13/16* (2006.01)
(Continued)

(52) U.S. Cl.
CPC ............... *F16H 3/10* (2013.01); *F03B 13/16* (2013.01); *F03G 7/08* (2013.01); *F16H 3/087* (2013.01);
(Continued)

(58) Field of Classification Search
CPC ... F16H 3/10; F16H 3/30; F16H 3/087; F16H 2712/06; F03B 13/16
(Continued)

(56) References Cited

U.S. PATENT DOCUMENTS 326,718 A * 9/1885 Collins ................. F04D 25/166
415/125
4,105,368 A 8/1978 Waters
(Continued)

FOREIGN PATENT DOCUMENTS

CN 101952619 A 1/2011
CN 105156605 A 12/2015
(Continued)

*Primary Examiner* — Ha Dinh Ho
(74) *Attorney, Agent, or Firm* — True Shepherd LLC; Andrew C. Cheng (57) ABSTRACT

A one-way power conversion device (24) and a power system having the one-way power conversion device are provided. The one-way power conversion device (24) includes a one-way gearbox (18), a first transmission shaft (15), a second transmission shaft (16), and a swing rotation component (19). The device includes a combination of one or more one-way power conversion devices (24), which can absorb swinging powers coming from different directions and convert the swinging powers into an available one-way rotation power. The device can absorb the swinging power in any direction, and has the advantages of a high absorption and conversion efficiency, a stable power output, low costs of construction and maintenance, a high stability, and a wide application range.

19 Claims, 6 Drawing Sheets

(51) Int. Cl.
  *F03G 7/08* (2006.01)
  *F16H 3/087* (2006.01)
(52) U.S. Cl.
  CPC .. *F05B 2260/4031* (2013.01); *F16H 2712/06* (2013.01)
(58) Field of Classification Search
  USPC .......................................................... 74/333
  See application file for complete search history.

(56) References Cited

U.S. PATENT DOCUMENTS

| | | | | |
|---|---|---|---|---|
| 4,391,154 | A * | 7/1983 | Tortella | F16H 3/30 |
| | | | | 74/342 |
| 8,497,594 | B2 * | 7/2013 | Rajadhyaksha | F03B 17/063 |
| | | | | 290/53 |
| 8,659,180 | B2 * | 2/2014 | Earl | F03B 17/063 |
| | | | | 290/54 |
| 2010/0083746 | A1 | 4/2010 | Chen et al. | |
| 2010/0225118 | A1 | 9/2010 | Micu | |

FOREIGN PATENT DOCUMENTS

| | | | |
|---|---|---|---|
| CN | 107023623 | A | 8/2017 |
| CN | 107250536 | A | 10/2017 |
| CN | 110319169 | A | 10/2019 |

* cited by examiner

ONE-WAY POWER CONVERSION DEVICE AND POWER SYSTEM HAVING SAME

CROSS-REFERENCE TO RELATED APPLICATIONS

This application is a continuation of International Patent Application No. PCT/CN2019/100389 with a filing date of Aug. 13, 2019, designating the United States, now pending, and further claims priorities to Chinese Patent Application No. 201910518244.1 with a filing date of Jun. 15, 2019 and Chinese Patent Application No. 201910719082.8 with a filing date of Aug. 6, 2019. The content of the aforementioned applications, including any intervening amendments thereto, are incorporated herein by reference.

TECHNICAL FIELD

The present disclosure belongs to the field of power conversion technologies, and in particular to a one-way power conversion device and a power system having the one-way power conversion device.

BACKGROUND

Wave power generation has a large energy density, and creates energies day and night. However, an uncertainty of a fluctuation direction leads to unfavorable factors, such as unstable power output, low efficiency, and etc., thus constraining commercialization of the entire wave power generation industry. Most of the existing wave power generation technologies absorb wave energies from one or at least two directions, which have difficulty in absorbing wave energies from all directions, and are also easily subjected to damage caused by lateral waves. Chinese Patent Application No. 201610214252.3, entitled "ISLAND OCEAN PLATFORM UNIVERSAL WAVE POWER GENERATION UNIT AND POWER GENERATION DEVICE", describes a technology that can convert rotation powers of two swing directions. In this document, a first swing direction is a direction where a swing input shaft swings laterally, and a second swing direction is a direction where a swing box swings longitudinally. When the swing box swings longitudinally, such as rotating longitudinally to the left, a lateral swing power of the swing input shaft and a longitudinal rotation power of the swing box are superimposed on each other and then output to a power output shaft. When the swing box rotates longitudinally to the right, the rotation power of the swing box needs to be changed by a bevel gear in another gearbox and then output to the power output shaft. However, in this case, the rotation power generated by the swing input shaft on the swing box is canceled out due to the reverse rotation of the rotating box, because the rotation direction of the rotating box is opposite to an output direction of a rotation power of the bevel gear, which reduces energy absorption and conversion efficiency, and on the other hand, weakens the stability of the power output, thereby resulting in a large fluctuation in the power output.

SUMMARY

An objective of the present disclosure is, for example, to provide a one-way power conversion device, which may reduce the damage of an unstable power source to equipment, and, in addition, simultaneously absorb swing powers coming from different directions, superimpose all the absorbed swing powers and output an available one-way rotation power, so as to drive a power load. The gear combination structure of the present disclosure may alternately share the load, thereby maximizing a load bearing capacity. The one-way power conversion device according to the present disclosure has the advantages of a compact structure, a strong ability to resist natural disasters, and low costs of construction and maintenance, which may be used in a broad range of fields, including but not limited to, marine power generation in different environments.

Another objective of the present disclosure is to provide a power system, which has all the advantages of the one-way power conversion device.

The present disclosure adopts the following technical solutions:

An aspect of the present disclosure provides a one-way power conversion device, including: a fixed bracket; at least one set of a swing rotation component, connected to an unstable power source; at least one set of a one-way power gearbox, mounted on the fixed bracket; a gear set, mounted inside the swing rotation component and/or the one-way power gearbox, and configured to maintain a respective one-way rotational motion under the action of an external force; multiple sets of one-way clutches, mounted inside the swing rotation component and/or the one-way power gearbox; at least one first transmission shaft rotating reversely, having a hollow structure, connected to one of the one-way clutches, and configured to receive only a reverse rotation power of the swing rotation component and/or a reverse rotation power inside the swing rotation component, so as to drive gears rotating reversely in the one-way power gearbox; and at least one second transmission shaft rotating forward, passing through the first transmission shaft, connected to another one of the one-way clutches, and configured to receive only a forward rotation power of the swing rotation component and/or a forward rotation power inside the swing rotation component, so as to drive gears rotating forward in the one-way power gearbox.

Optionally, the swing rotation component includes: any one or a combination of any two or more of a pulley set, a sprocket set, a swing box, the first transmission shaft, the second transmission shaft, the gear set, and the one-way clutches.

Optionally, the swing rotation component includes: a swing box, the first transmission shaft, the second transmission shaft, a first one-way clutch, and a second one-way clutch. The first one-way clutch and the second one-way clutch are both mounted in the swing box. The first transmission shaft is in a transmission connection with the first one-way clutch, and the first one-way clutch is configured to drive the first transmission shaft to rotate reversely. The second transmission shaft is in a transmission connection with the second one-way clutch, and the second one-way clutch is configured to drive the second transmission shaft to rotate forward.

Optionally, the second transmission shaft passes through the first transmission shaft.

Optionally, the unstable power source is any one or a combination of any two or more selected from among a buoyancy chamber, a pendulum, a car, and a ship.

Optionally, the one-way power gearbox includes: a power output shaft, at least one first bevel gear rotating reversely along a longitudinal axis, at least one second bevel gear rotating forward along a longitudinal axis, and at least one third bevel gear rotating reversely along a lateral axis. The first bevel gear is driven directly or indirectly by the first transmission shaft. The second bevel gear is arranged oppositely with the first bevel gear, and is driven directly or indirectly by the second transmission shaft. The third bevel gear is located between the first bevel gear and the second bevel gear, and is meshed with both the first bevel gear and the second bevel gear. The power output shaft is connected to at least one of the bevel gear arranged longitudinally or the bevel gears arranged laterally.

Optionally, the one-way power gearbox further includes: a fourth bevel gear. The fourth bevel gear is arranged oppositely with the third bevel gear. The fourth bevel gear is located between the first bevel gear and the second bevel gear, and is meshed with both the first bevel gear and the second bevel gear.

Optionally, the swing rotation component further includes: a fifth bevel gear, a sixth bevel gear, and a seventh bevel gear. The fifth bevel gear and the sixth bevel gear are arranged oppositely. The seventh bevel gear is located between the fifth bevel gear and the sixth bevel gear, and meshed with both the fifth bevel gear and the sixth bevel gear. An end of the first transmission shaft is connected to the first bevel gear, and the other end of the first transmission shaft is connected to the fifth bevel gear by the first one-way clutch. An end of the second transmission shaft passes through the first bevel gear and then connected to the second bevel gear, and the other end of the second transmission shaft passes through the fifth bevel gear and then connected to the sixth bevel gear by the second one-way clutch.

Optionally, the swing rotation component further includes: an eighth bevel gear. The eighth bevel gear is arranged oppositely with the seventh bevel gear. The eighth bevel gear is located between the fifth bevel gear and the sixth bevel gear, and is meshed with both the fifth bevel gear and the sixth bevel gear.

Optionally, the swing rotation component further includes: a lateral swing shaft. The lateral swing shaft is connected to the seventh bevel gear.

Optionally, the swing rotation component further includes: a third one-way clutch. The lateral swing shaft is connected to the seventh bevel gear by the third one-way clutch.

Optionally, the swing rotation component further includes: two lateral swing shafts. The two lateral swing shafts are respectively connected to the seventh bevel gear and the eighth bevel gear.

Optionally, the swing rotation component further includes: a third one-way clutch and a fourth one-way clutch. The one of the two lateral swing shafts is connected to the seventh bevel gear by the third one-way clutch, and the other one of the two lateral swing shafts is connected to the eighth bevel gear by the fourth one-way clutch.

Optionally, the swing rotation component includes: the swing box that has a hollow structure, the first one-way clutch, and the second one-way clutch. The first one-way clutch and the second one-way clutch are both mounted inside the swing box. The swing box is configured to drive the first one-way clutch to move, and drive the first transmission shaft to rotate reversely under the action of the first one-way clutch. The swing box is further configured to drive the second one-way clutch to move, and drive the second transmission shaft to rotate forward under the action of the second one-way clutch.

Optionally, the swing rotation component includes: the swing box that swings longitudinally, and a lateral swing shaft that swings laterally. The lateral swing shaft is mounted to the swing box. The lateral swing shaft is configured to receive an external unstable power source, and drive the swing box to swing longitudinally and/or gears inside the swing box to rotate.

Optionally, the swing rotation component includes: at least one fifth bevel gear rotating reversely along a longitudinal axis and mounted in the swing box, at least one sixth bevel gear rotating forward along a longitudinal axis and mounted in the swing box, at least one seventh bevel gear rotating reversely along a lateral axis and mounted in the swing box, and at least one eighth bevel gear rotating forward along a lateral axis and mounted in the swing box, the first one-way clutch, the second one-way clutch, a third one-way clutch, and a fourth one-way clutch. The fifth bevel gear is connected directly or indirectly to the first transmission shaft. The sixth bevel gear is arranged oppositely with the fifth bevel gear, and is connected directly or indirectly to the second transmission shaft. The seventh bevel gear and the eighth bevel gear, and the fifth bevel gear and the sixth bevel gear are arranged longitudinally and laterally, and meshed with one another. The first transmission shaft is connected to the fifth bevel gear by the first one-way clutch. The first one-way clutch is configured to receive a reverse rotation power of the swing box and/or a reverse rotation power of the fifth bevel gear, and drive the first transmission shaft and the first bevel gear to rotate reversely. The sixth bevel gear is connected to the second transmission shaft by the second one-way clutch. The second one-way clutch is configured to receive a forward rotation power of the swing box and/or a forward rotation power of the sixth bevel gear, and drive the second transmission shaft and the second bevel gear to rotate forward. The third one-way clutch is connected to one lateral swing shaft, and is configured to be driven by the lateral swing shaft to drive the seventh bevel gear to rotate reversely. The fourth one-way clutch is connected to another lateral swing shaft, and is configured to be driven by the lateral swing shaft to drive the eighth bevel gear to rotate forward. The second transmission shaft passes through both the fifth bevel gear and the first bevel gear.

Optionally, the lateral swing shaft is in the form of two sub-shafts with the same axis that are respectively mounted at left and right sides of the swing box. Alternatively, the lateral swing shaft is in the form of one shaft for a single ended input that is mounted at a side of the swing box.

Another aspect of the present disclosure provides a power system, including one or a plurality of one-way power conversion devices as described above. The plurality of one-way power conversion devices share the one-way power gearbox, the swing rotation component, the first transmission shaft, and the second transmission shaft. The one-way power gearbox is connected end to end with the swing rotation component as a whole. The plurality of one-way power conversion devices, by a series connection, share the swing rotation component to connect to an unstable power source, and share the power output shaft to cooperatively drive a load.

Optionally, the power system includes: a first one-way power conversion device and a second single-way power conversion device. A swing box of the first one-way power conversion device and a one-way power gearbox of the second single-way power conversion device are combined as a whole and share one gearbox, which swings horizontally with an unstable power source. A swing rotation component of the second one-way power conversion device has functions of longitudinal swing and lateral swing. The second one-way power conversion device and the first one-way power conversion device are formed into a one-way power combination with at least three swing directions.

Optionally, a second bevel gear or a third bevel gear of the second one-way power conversion device is connected to a seventh bevel gear or a sixth bevel gear of the first one-way power conversion device. A one-way clutch for reverse transmission and a one-way clutch for forward transmission are mounted on each swing direction axis of the power system. The one-way clutch for reverse transmission is mounted between transmission components rotating reversely, and the one-way clutch for forward transmission is mounted between transmission components rotating forward.

Compared with the relate art, the embodiments of the present disclosure have the following beneficial effects:
1. The present disclosure has the advantages of a simple structure, and low costs of construction and maintenance. The internal structure mainly includes combinations of the bevel gears and the one-way clutches. The bevel gear transmission features a high transmission efficiency, and a large transmission torque in a case of the same gear module.
2. The present disclosure has a strong ability to resist wind and waves. The one-way power conversion device having functions of multi-directional swings is formed, which exhibits strong resistance to wind and waves.
3. The power output is stabilized, and absorption and conversion efficiency is enhanced. A swing rotation power of each direction may be superimposed on one another in a direct drive manner to generate a composite power, and the composite power is outputted to the power output shaft. Thus, the swing rotation power of each direction may be superimposed in series without torque loss, which improves dynamic response sensitivity, thereby allowing the power output to be more stable, and the absorption and conversion efficiency to be increased.
4. The present disclosure may flexibly combine a plurality of one-way power conversion devices, and superimpose swing powers of a plurality of directions. The one-way powers of the plurality of directions after conversion may be connected in series, and superimposed on one another, without interfering with one another, thereby further improving transmission conversion efficiency.

BRIEF DESCRIPTION OF THE DRAWINGS

To describe the technical solutions in the examples of this application more clearly, the accompanying drawings required in the examples are briefly described below. It should be understood that, the following accompanying drawings show merely some examples of this application, and thus should not be regarded as a limitation to the scope of this application. A person of ordinary skill in the art may still derive other related drawings from these accompanying drawings without creative efforts.

REFERENCE NUMERALS

1—first bevel gear; 2—second bevel gear; 3—third bevel gear; 4—fourth bevel gear; 5—fifth bevel gear; 6—sixth bevel gear; 7—seventh bevel gear; 8—eighth bevel gear; 9—first one-way clutch; 10—second one-way clutch; 11—third one-way clutch; 12—fourth one-way clutch; 13—first one-way power conversion device; 14—second one-way power conversion device; 15—first transmission shaft; 16—second transmission shaft; 17—gear set; 18—one-way power gearbox; 19—swing rotation component; 20—swing box; 21—lateral swing shaft; 22—power output shaft; 23—one-way clutch; 24—one-way power conversion device; and 25—power system.

DETAILED DESCRIPTION OF THE EMBODIMENTS

To make the objective, technical solutions, and advantages of the present disclosure clearer, the exemplary embodiments of the present disclosure are described below with reference to accompanying drawings. These exemplary embodiments are provided to enable a person of ordinary skill in the art to clearly understand the present disclosure and implement the present disclosure based on the description herein. The accompanying drawings and specific embodiments are not intended to limit the present disclosure, and the scope of the present disclosure is defined by the appended claims.

Therefore, the detailed description of the embodiments of the present disclosure with reference to the accompanying drawings is not intended to limit the protection scope of the present disclosure, but merely to represent the selected embodiments of the present disclosure. All other embodiments obtained by those of ordinary skill in the art based on the embodiments of the present disclosure without creative efforts should fall within the protection scope of the present disclosure.

It should be noted that similar reference signs and letters represent similar items in the accompanying drawings below. Therefore, once an item is defined in one drawing, it does not need to be further defined and described in subsequent drawings.

In the description of the present disclosure, the terms such as "first" and "second" are used only for the purpose of description and are not intended to indicate or imply relative importance. Thus, the features defined with "first" and "second" may explicitly or implicitly include one or more of these features. Unless otherwise indicated, in the description of the present disclosure, "plurality" means two or more than two. The "forward", "reverse", "lateral", and "longitudinal" in the description of the present disclosure are only for ease of understanding and description, and are intended to limit directions, which may be understood relatively according to different references. In the description of the present disclosure, the terms "mounted", "connection", "connected", and "fixed" and other terms should be understood in a broad sense. For example, a connection may be a fixed connection, a detachable connection, or an integration; or, may be a mechanical connection or an electrical connection; or, a direct connection or an indirect connection through an intermediary; or, a communication between two elements or an interaction relationship between two elements. A person of ordinary skill in the art may understand specific meanings of the foregoing terms in the present disclosure based on a specific situation.

It should be noted that, if there is no conflict, the following embodiments and features in the embodiments may be mutually combined.

Referring to FIG. 1 to FIG. 3 and FIG. 6 to FIG. 7, the present disclosure provides a one-way power conversion device 24, including: at least one set of a swing rotation component 19 connected to an unstable power source, at least one set of a one-way power gearbox 18, a gear set 17, multiple sets of one-way clutches 23, at least one first transmission shaft 15 rotating reversely, and at least one second transmission shaft 16 rotating forward. The one-way power gearbox 18 is mounted on a fixed bracket (not shown in the figure). The gear set 17 is mounted inside the swing rotation component 19 and/or inside the one-way power gearbox 18, and may maintain a respective one-way rotational motion under the action of an external force. The multiple sets of one-way clutches 23 are mounted inside the swing rotation component 19 and/or inside the one-way power gearbox 18. The first transmission shaft 15 is arranged to have a hollow structure, and is in a transmission connection with one of the one-way clutches 23. The first transmission shaft 15 is configured to receive only a reverse rotation power outside the outside of the swing rotation component 19 and/or a reverse rotation power of the swing rotation component 19, so as to drive gears rotating reversely in the one-way power gearbox 18. The second transmission shaft 16 passes through the first transmission shaft 15, and is in a transmission connection with one of the one-way clutches 23. The second transmission shaft 16 is configured to receive only a forward rotation power outside the swing rotation component 19 and/or inside the swing rotation component 19, so as to drive gears rotating forward in the one-way power gearbox 18.

Optionally, the one-way power gearbox 18 includes at least one first bevel gear 1 rotating reversely along a longitudinal axis, at least one second bevel gear 2 rotating forward along a longitudinal axis, at least one third bevel gear 3 rotating reversely along a lateral axis, and/or at least one fourth bevel gear 4 rotating forward along a lateral axis. It will be appreciated that quantities of the first bevel gear 1, the second bevel gear 2, the third bevel gear 3, and the fourth bevel gear 4 are set as needed. In the present disclosure, optionally, the one-way power gearbox 18 includes one first bevel gear 1, one second bevel gear 2, and one third bevel gear 3. The first bevel gear 1 is driven directly or indirectly by the first transmission shaft 15. The second bevel gear 2 and the first bevel gear 1 are arranged oppositely and coaxially. The second bevel gear 2 is driven directly or indirectly by the second transmission shaft 16. The third bevel gear 3 is located between the first bevel gear 1 and the second bevel gear 2, and meshed with both the first bevel gear 1 and the second bevel gear 2. The one-way power conversion device also includes a power output shaft 22, which is connected to the second bevel gear 2 or the third bevel gear 3.

In the present disclosure, optionally, the one-way power gearbox 18 includes one first bevel gear 1, one second bevel gear 2, one third bevel gear 3, and one fourth bevel gear 4. The first bevel gear 1 is driven directly or indirectly by the first transmission shaft 15. The second bevel gear 2 and the first bevel gear 1 are arranged oppositely and coaxially. The second bevel gear 2 is driven directly or indirectly by the second transmission shaft 16. The third bevel gear 3 is located between the first bevel gear 1 and the second bevel gear 2, and meshed with both the first bevel gear 1 and the second bevel gear 2. The fourth bevel gear 4 is located between the first bevel gear 1 and the second bevel gear 2, and meshed with both the first bevel gear 1 and the second bevel gear 2. The third bevel gear 3 and the fourth bevel gear 4 are arranged oppositely and coaxially. The one-way power conversion device 24 also includes a power output shaft 22, which is connected to any one of the second bevel gear 2, the third bevel gear 3, and the fourth bevel gear 4.

Figure 2:
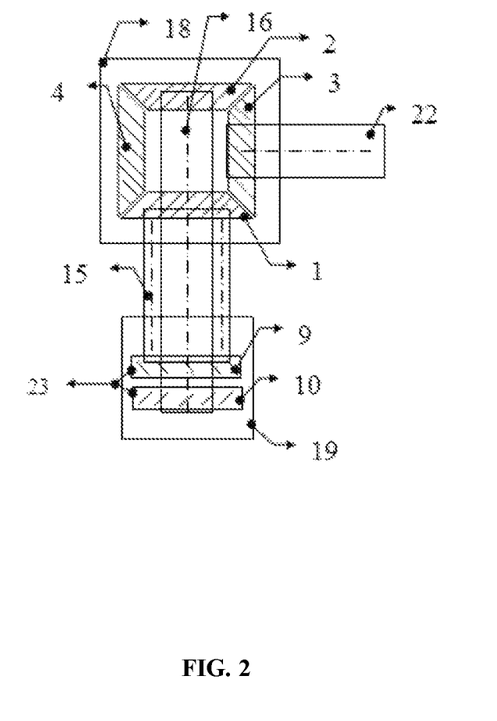
FIG. 2 is a cross-sectional diagram of a one-way power conversion device according to an embodiment of the present disclosure.

Referring to FIG. 2, optionally, the swing rotation component 19 includes a pulley set (not shown in the figure), a sprocket set (not shown in the figure), a swing box 20 having a hollow structure, a first one-way clutch 9, and a second one-way clutch 10.

The first one-way clutch 9 and the second one-way clutch 10 are both mounted inside the swing box 20. The first one-way clutch 9 is in a transmission connection with the swing box 20 by the first transmission shaft 15, and the second one-way clutch 10 is in a transmission connection with the swing box body 20 by the second transmission shaft 16. The swing box 20 is configured to receive an external unstable power source, and rotate back and forth. In addition, the swing box 20 drives the first transmission shaft 15 to rotate reversely under the action of the first one-way clutch 9, so as to drive the first bevel gear 1 to rotate reversely; and drives the second transmission shaft 16 to rotate forward under the action of the second one-way clutch 10, so as to drive the second bevel gear 2 to rotate forward. The first bevel gear 1 and the second bevel gear 2 alternately drive the third bevel gear 3 and/or the fourth bevel gear 4 to perform one-way rotational motion, so as to drive the power output shaft 22 to perform one-way rotational motion and output a power.

Figure 1:
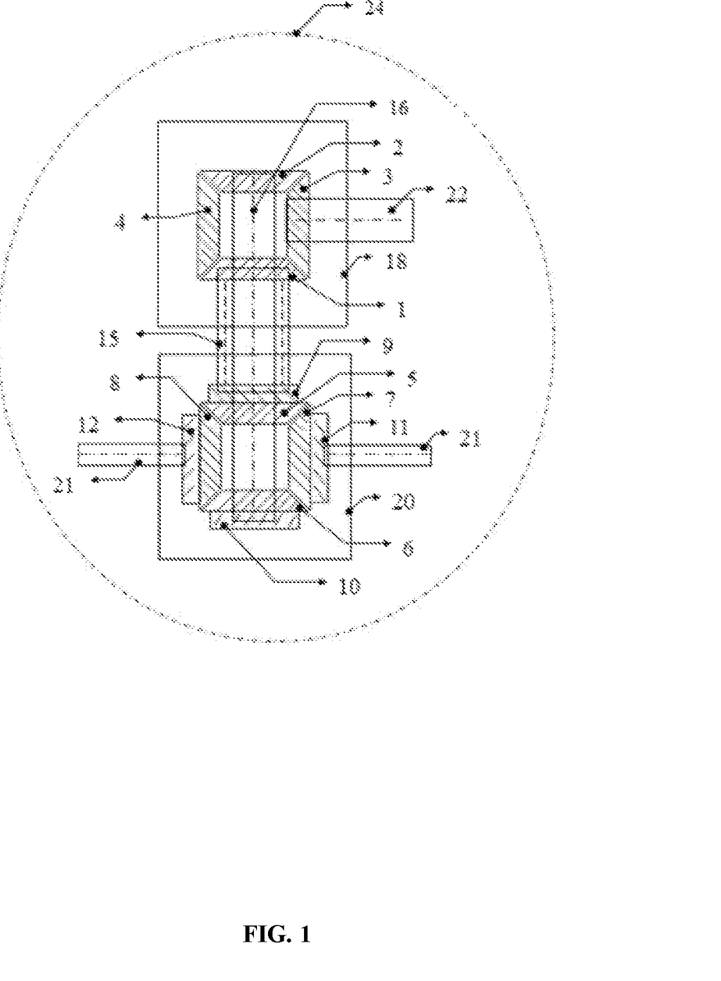
FIG. 1 is a cross-sectional side view of a one-way power conversion device according to an embodiment of the present disclosure (a lateral swing shaft for double ended input).
Figure 3:
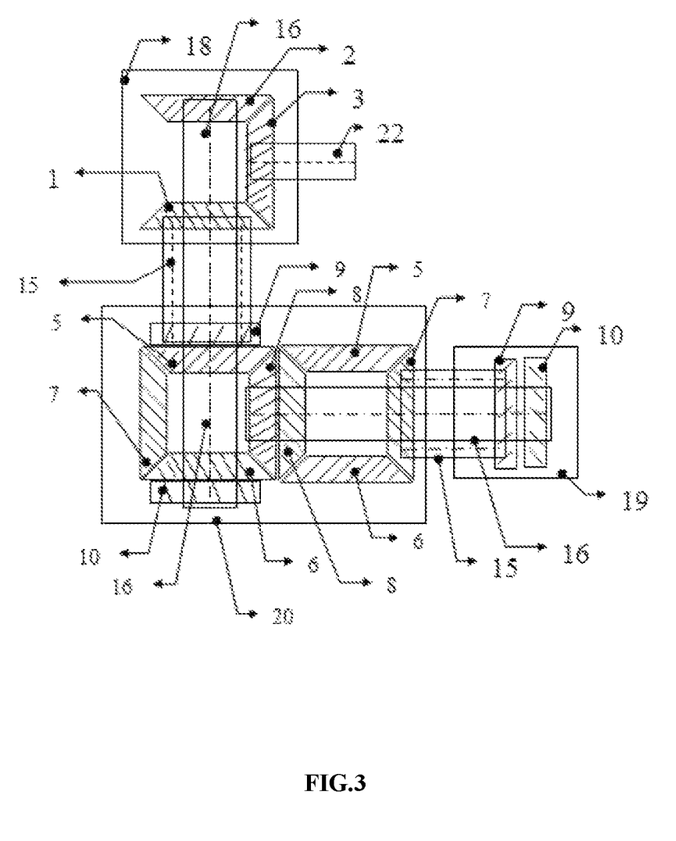
FIG. 3 is a cross-sectional side view of a one-way power conversion device according to an embodiment of the present disclosure (a lateral swing shaft for single ended input).

Referring to FIG. 1 and FIG. 3, optionally, the swing rotation component 19 also includes a lateral swing shaft 21 swinging laterally that is connected to the swing box 20 swinging longitudinally. The lateral swing shaft 21 is configured to receive an external unstable power source, and drive the swing box 20 to swing longitudinally and/or the gears inside the swing box 20 to rotate.

Again, referring to FIG. 1, the lateral swing shaft 21 is in the form of two sub-shafts, used for left and right inputs. Optionally, the swing rotation component 19 includes: a fifth bevel gear 5 rotating reversely along a longitudinal axis and mounted in the swing box 20, a sixth bevel gear 6 rotating forward along a longitudinal axis and mounted in the swing box 20, a seventh bevel gear 7 rotating reversely along a lateral axis and mounted in the swing box 20, an eighth bevel gear 8 rotating forward along a lateral axis and mounted in the swing box 20, a first one-way clutch 9, a second one-way clutch 10, a third one-way clutch 11, and a fourth one-way clutch 12.

The fifth bevel gear 5 is connected directly or indirectly to the first transmission shaft 15. Optionally, the one-way clutch 9 may be mounted at any connection point of the fifth bevel gear 5, the first transmission shaft 15 and the first bevel gear 1. In other words, the one-way clutch 9 may be mounted between the fifth bevel gear 5 and the first transmission shaft 15, or between the first bevel gear 1 and the first transmission shaft 15, so as to output a rotation power of the fifth bevel gear 5 to the first bevel gear 1 through the first transmission shaft 15. The sixth bevel gear 6 and the fifth bevel gear 5 are arranged oppositely and coaxially. The sixth bevel gear 6 is connected directly or indirectly to the second transmission shaft 16. Optionally, the one-way clutch 10 may be mounted at any connection point of the sixth bevel gear 6, the second transmission shaft 16 and the second bevel gear 2. In other words, the one-way clutch 10 may be mounted between the sixth bevel gear 6 and the second transmission shaft 16, or between the second bevel gear 2 and the second transmission shaft 16, so as to output a rotation power of the sixth bevel gear 6 to the second bevel gear 2 through the second shift shaft 16. The seventh bevel gear 7 and the eighth bevel gear 8 are arranged oppositely and coaxially. The seventh bevel gear 7 and the eighth bevel gear 8 are both located between the fifth bevel gear 5 and the sixth bevel gear 6, and both meshed with the fifth bevel gear 5 and the sixth bevel gear 6. Optionally, the fifth bevel gear 5 is in a transmission connection with the first transmission shaft 15 by the first one-way clutch 9. The first one-way clutch 9 is configured to receive a reverse rotation power of the swing box 20 and/or a reverse rotation power of the fifth bevel gear 5, and drive the first transmission shaft 15 and the first bevel gear 1 to rotate reversely. Optionally, the sixth bevel gear 6 is in a transmission connection with the second transmission shaft 16 by the second one-way clutch 10. The second one-way clutch 10 is configured to receive a forward rotation power of the swing box 20 and/or a forward rotation power of the sixth bevel gear 6, and drive the second transmission shaft 16 and the second bevel gear 2 to rotate forward. Optionally, the seventh bevel gear 7 is in a transmission connection with the right sub-shaft of the lateral swing shaft 21 by the third one-way clutch 11. The third one-way clutch 11 is configured to be driven by the right sub-shaft of the lateral swing shaft 21 to drive the seventh bevel gear 7 to rotate reversely. Optionally, the eighth bevel gear 8 is in a transmission connection with the left sub-shaft of the lateral swing shaft 21 by the fourth one-way clutch 12. The fourth one-way clutch 12 is configured to be driven by the left sub-shaft of the lateral swing shaft 21 to drive the eighth bevel gear 8 to rotate forward. The second transmission shaft 16 passes through both the fifth bevel gear 5 and the first bevel gear 1. In addition, two ends of the second transmission shaft 16 are respectively connected to the sixth bevel gear 6 and the second bevel gear 2 in the one-way power gearbox 18.

Optionally, referring to FIG. 3, the present disclosure also provides a one-way power conversion device 24 with two swing directions, and the lateral swing input may be a single ended input. In the present disclosure, inside the swing box 20, there includes two sets of gear sets 17 combined with each other, combinations formed by two sets of first transmission shafts 15 and two sets of second transmission shafts 16. Specifically, the first one-way clutch 9 and the second one-way clutch 10 are mounted inside the swing rotation component 19. When the swing rotation component 19 receives an unstable power source and swings laterally, the first transmission shaft 15 and the second transmission shaft 16 are alternately driven under the action of the first one-way clutch 9 and the second one-way clutch 10, so as to drive the seventh bevel gear 7 and the eighth bevel gear 8 to rotate alternately in one direction, thereby driving the two sets of gear sets 17 in the swing box 20 to perform one-way rotational motion. When the swing rotation component 19 receives an external unstable power source and swings longitudinally, it also drives the swing box 20 to perform swing rotation back and forth in a longitudinal direction. When the swing box 20 swings reversely, the fifth bevel gear 5 inside the swing box 20 rotates reversely, and at the same time rotates reversely along with the swing box 20, which, under the action of the one-way clutch 23, only drives the first transmission shaft 15 in the reverse direction, so as to drive the first bevel gear 1 to rotate reversely. When the swing rotation component 19 drives the swing box 20 to swing forward, the sixth bevel gear 6 inside the swing box 20 rotates forward, and at the same time rotates forward along with the swing box 20, which, under the action of the one-way clutch 23, only drives the second transmission shaft 16 in the forward direction, so as to drive the second bevel gear 2 to rotate forward. It should be noted that the present disclosure places no limit on the number of the gears inside the swing box 20 and the structural combination. For example, one gear set 17 of the two sets of gear sets in the swing box 20 that is close to the swing rotation component 19 swinging laterally may include no fifth bevel gear 5 or no sixth bevel gear 6, and the other gear set 17 may include no seventh bevel gear 7.

The above description shows the one-way power conversion device with two swing directions and the one-way power conversion device with one swing direction, based on which the present disclosure may have more combination manners. For example, referring to FIG. 4 and FIG. 5, the present disclosure provides a power system, including one or a plurality of one-way power conversion devices 24 as described above. The plurality of one-way power conversion devices 24 share the one-way power gearbox 18, the swing rotation component 19, the first transmission shaft 15, and the second transmission shaft 16. The one-way power gearbox 18 is connected end to end with the swing rotation component 19 as a whole. The plurality of one-way power conversion devices 24, by a series connection, share the swing rotation component 19 to connect to an unstable power source, and share the power output shaft 22 to cooperatively drive a load (not shown in the figure).

Figure 4:
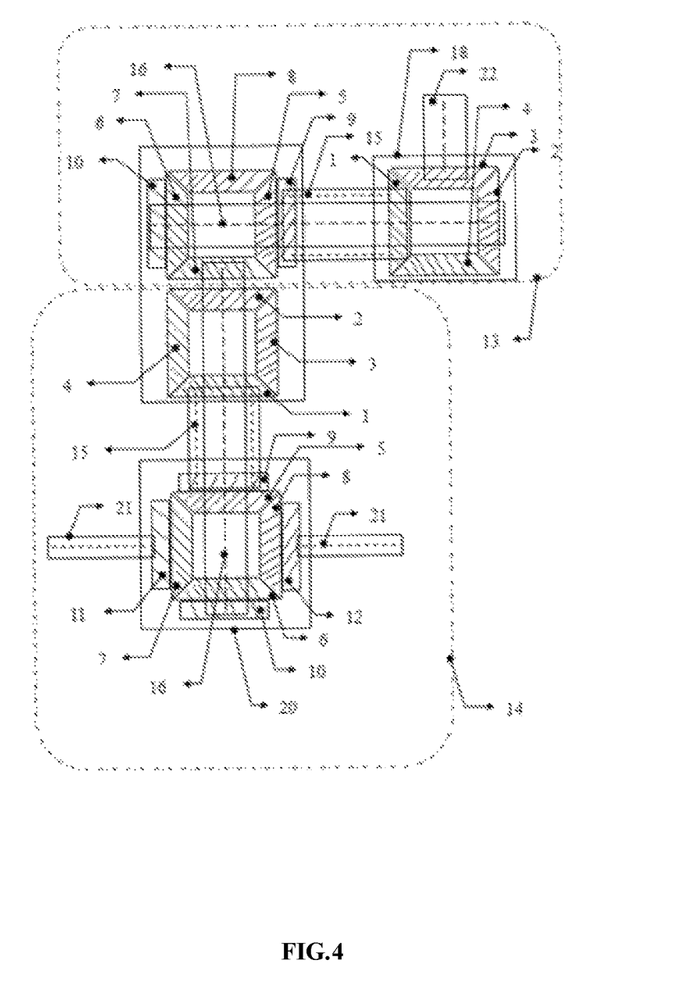
FIG. 4 is a cross-sectional side view of a power system according to an embodiment of the present disclosure.
Figure 5:
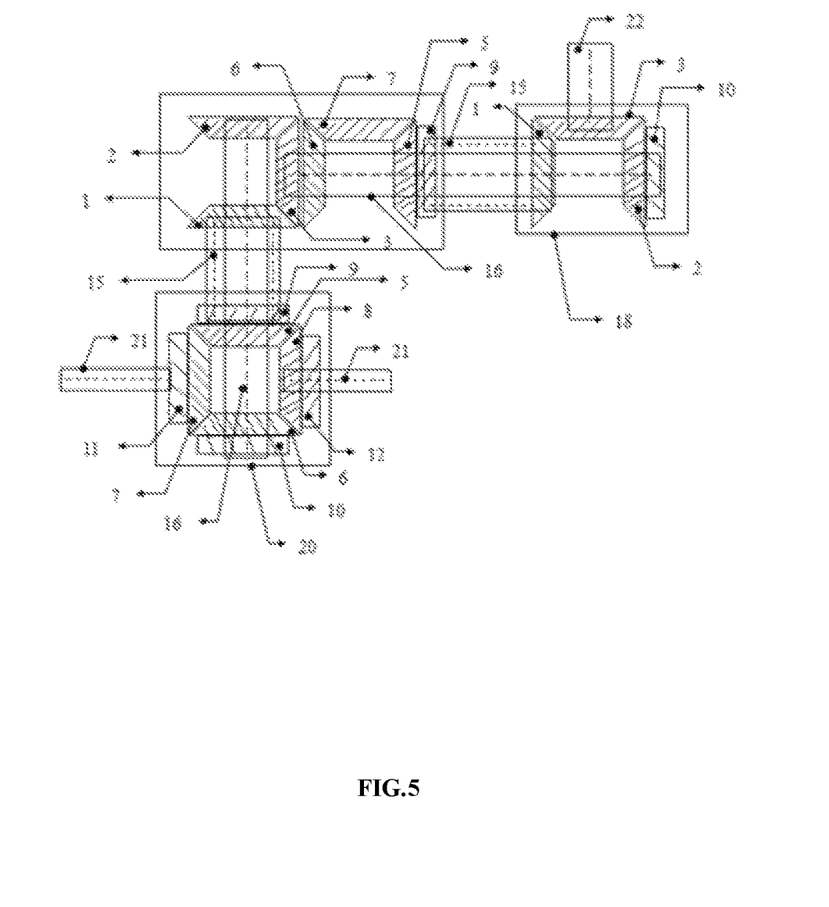
FIG. 5 is a cross-sectional side view of a deformed structure of a power system according to the embodiment of the present disclosure.
Figure 6:
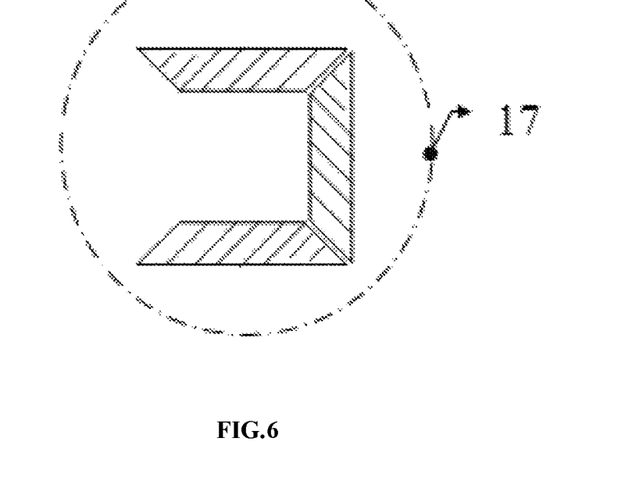
FIG. 6 is a structural diagram of a gear set according to an embodiment of the present disclosure (a combination of three bevel gears).
Figure 7:
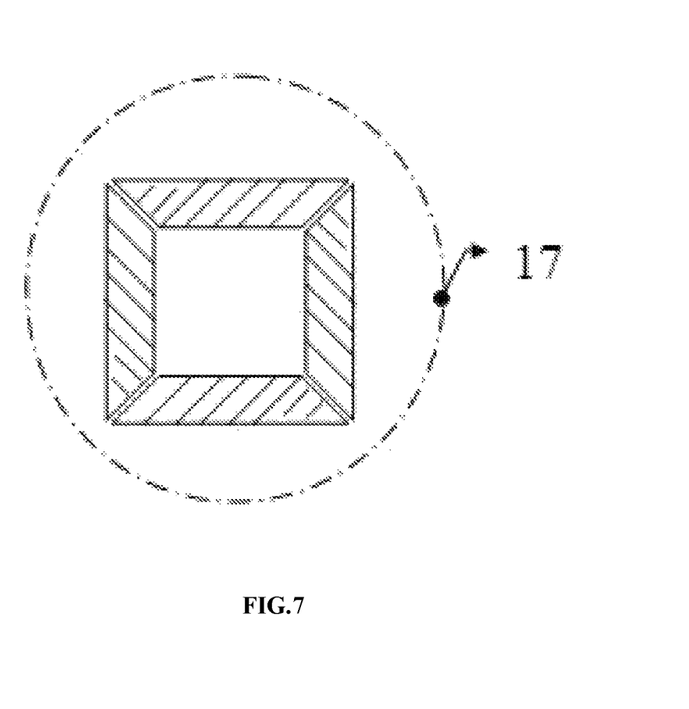
FIG. 7 is a structural diagram of a gear set according to an embodiment of the present disclosure (a combination of four bevel gears).

Optionally, the power system includes a first one-way power conversion device 13 and a second single-way power conversion device 14. A swing box 20 of the first one-way power conversion device 13 and a one-way power gearbox 18 of the second single-way power conversion device 14 are combined as a whole and share one gearbox, which swings horizontally with an unstable power source. The swing rotation component 19 of the second one-way power conversion device 14 has functions of longitudinal swing and lateral swing. Thus, the second one-way power conversion device 14 and the first one-way power conversion device 13 are formed into a one-way power conversion combination with at least three swing directions. The second bevel gear 2 or the third bevel gear 3 of the second one-way power conversion device 14 is connected to the seventh bevel gear 7 or the sixth bevel gear 6 of the first one-way power conversion device 13. A one-way clutch 23 for reverse transmission and a one-way clutch 23 for forward transmission are mounted on each swing direction axis of the power system. The one-way clutch 23 for reverse transmission is mounted between the transmission components rotating reversely. The one-way clutch 23 for forward transmission is mounted between the transmission components rotating forward.

It should be noted that the swing box 20 of the first one-way power conversion device 13 and the one-way power gearbox 18 of the second one-way power conversion device 14 are combined as a whole, inside which the gearbox may be understood as the one-way gearbox 18, and may also be understood as the swing box 20, depending on different reference objects. Thus, the names of the gears in the gearbox may also vary with the name of the gearbox, which should be a generalized understanding herein.

The foregoing is merely illustrative of the preferred embodiments of the present disclosure and is not intended to limit the present disclosure, and various changes and modifications can be made to the present disclosure by those skilled in the art. Any modifications, equivalent replacements, improvements, etc. made within the spirit and scope of this application should be included within the protection scope of the present disclosure.

INDUSTRIAL APPLICABILITY

From above, the present disclosure provides a one-way power conversion device and a power system having the one-way power conversion device to improve energy utilization and strengthen the ability to resist wind and waves.

What is claimed is:

1. A one-way power conversion device, comprising:
a fixed bracket;
at least one set of a swing rotation component, connected to an unstable power source;
at least one set of a one-way power gearbox, mounted on the fixed bracket;
a gear set, mounted inside the swing rotation component and/or the one-way power gearbox, and configured to maintain a respective one-way rotational motion under action of an external force;
multiple sets of one-way clutches, mounted inside the swing rotation component and/or the one-way power gearbox;
at least one first transmission shaft rotating reversely, having a hollow structure, connected to one of the one-way clutches, and configured to receive only a reverse rotation power of the swing rotation component and/or a reverse rotation power inside the swing rotation component, so as to drive gears rotating reversely in the one-way power gearbox; and
at least one second transmission shaft rotating forward, passing through the first transmission shaft, connected to another one of the one-way clutches, and configured to receive only a forward rotation power of the swing rotation component and/or a forward rotation power inside the swing rotation component, so as to drive the gears rotating forward in the one-way power gearbox.

2. The one-way power conversion device according to claim 1, wherein the swing rotation component comprises: any one or a combination of any two or more of a pulley set, a sprocket set, a swing box, the first transmission shaft, the second transmission shaft, the gear set, and the one-way clutches.

3. The one-way power conversion device according to claim 1, wherein the swing rotation component comprises: a swing box, the first transmission shaft, the second transmission shaft, a first one-way clutch, and a second one-way clutch; the first one-way clutch and the second one-way clutch are both mounted in the swing box; the first transmission shaft is in a transmission connection with the first one-way clutch, and the first one-way clutch is configured to drive the first transmission shaft to rotate reversely; and the second transmission shaft is in a transmission connection with the second one-way clutch, and the second one-way clutch is configured to drive the second transmission shaft to rotate forward.

4. The one-way power conversion device according to claim 3, wherein the second transmission shaft passes through the first transmission shaft.

5. The one-way power conversion device according to claim 3, wherein the one-way power gearbox comprises: a power output shaft, at least one first bevel gear rotating reversely along a longitudinal axis, at least one second bevel gear rotating forward along a longitudinal axis, and at least one third bevel gear rotating reversely along a lateral axis; wherein, the first bevel gear is driven directly or indirectly by the first transmission shaft; the second bevel gear is arranged oppositely with the first bevel gear, and the second bevel gear is driven directly or indirectly by the second transmission shaft; the third bevel gear is located between the first bevel gear and the second bevel gear, and is meshed with both the first bevel gear and the second bevel gear; and the power output shaft is connected to at least one of the bevel gear arranged longitudinally or the bevel gears arranged laterally.

6. The one-way power conversion device according to claim 5, wherein the one-way power gearbox further comprises: a fourth bevel gear; wherein, the fourth bevel gear is arranged oppositely with the third bevel gear, the fourth bevel gear is located between the first bevel gear and the second bevel gear, and the fourth bevel gear is meshed with both the first bevel gear and the second bevel gear.

7. The one-way power conversion device according to claim 5, wherein the swing rotation component further comprises: a fifth bevel gear, a sixth bevel gear, and a seventh bevel gear; wherein, the fifth bevel gear and the sixth bevel gear are arranged oppositely; the seventh bevel gear is located between the fifth bevel gear and the sixth bevel gear, and meshed with both the fifth bevel gear and the sixth bevel gear; an end of the first transmission shaft is connected to the first bevel gear, and the other end of the first transmission shaft is connected to the fifth bevel gear by the first one-way clutch; an end of the second transmission shaft passes through the first bevel gear and then is connected to the second bevel gear, and the other end of the second transmission shaft passes through the fifth bevel gear and then is connected to the sixth bevel gear by the second one-way clutch.

8. The one-way power conversion device according to claim 7, wherein the swing rotation component further comprises: an eighth bevel gear; wherein, the eighth bevel gear is arranged oppositely with the seventh bevel gear, the eighth bevel gear is located between the fifth bevel gear and the sixth bevel gear, and the eighth bevel gear is meshed with both the fifth bevel gear and the sixth bevel gear.

9. The one-way power conversion device according to claim 7, wherein the swing rotation component further comprises: a lateral swing shaft; wherein, the lateral swing shaft is connected to the seventh bevel gear.

10. The one-way power conversion device according to claim 9, wherein the swing rotation component further comprises: a third one-way clutch; wherein, the lateral swing shaft is connected to the seventh bevel gear by the third one-way clutch.

11. The one-way power conversion device according to claim 8, wherein the swing rotation component further comprises: two lateral swing shafts; wherein, the two lateral swing shafts are respectively connected to the seventh bevel gear and the eighth bevel gear.

12. The one-way power conversion device according to claim 11, wherein the swing rotation component further comprises: a third one-way clutch and a fourth one-way clutch; wherein, one of the two lateral swing shafts is connected to the seventh bevel gear by the third one-way clutch, and the other one of the two lateral swing shafts is connected to the eighth bevel gear by the fourth one-way clutch.

13. The one-way power conversion device according to claim 5, wherein the swing rotation component comprises: the swing box that has a hollow structure, the first one-way clutch, and the second one-way clutch; wherein, the first one-way clutch and the second one-way clutch are both mounted inside the swing box; the swing box is configured to drive the first one-way clutch to move, and drive the first transmission shaft to rotate reversely under the action of the first one-way clutch; and the swing box is further configured to drive the second one-way clutch to move, and drive the second transmission shaft to rotate forward under the action of the second one-way clutch.

14. The one-way power conversion device according to claim 13, wherein the swing rotation component comprises: the swing box that swings longitudinally, and a lateral swing shaft that swings laterally; wherein, the lateral swing shaft is mounted to the swing box; and the lateral swing shaft is configured to receive an external unstable power source, and drive the swing box to swing longitudinally and/or gears inside the swing box to rotate.

15. The one-way power conversion device according to claim 14, wherein the swing rotation component comprises: at least one fifth bevel gear rotating reversely along a longitudinal axis and mounted in the swing box, at least one sixth bevel gear rotating forward along a longitudinal axis and mounted in the swing box, at least one seventh bevel gear rotating reversely along a lateral axis and mounted in the swing box, and at least one eighth bevel gear rotating forward along a lateral axis and mounted in the swing box, the first one-way clutch, the second one-way clutch, a third one-way clutch, and a fourth one-way clutch; wherein, the fifth bevel gear is connected directly or indirectly to the first transmission shaft; the sixth bevel gear is arranged oppositely with the fifth bevel gear, and the sixth bevel gear is connected directly or indirectly to the second transmission shaft; the seventh bevel gear and the eighth bevel gear, and the fifth bevel gear and the sixth bevel gear are arranged longitudinally and laterally, and meshed with one another; the first transmission shaft is connected to the fifth bevel gear by the first one-way clutch; the first one-way clutch is configured to receive a reverse rotation power of the swing box and/or a reverse rotation power of the fifth bevel gear, and drive the first transmission shaft and the first bevel gear to rotate reversely; the sixth bevel gear is connected to the second transmission shaft by the second one-way clutch; the second one-way clutch is configured to receive a forward rotation power of the swing box and/or a forward rotation power of the sixth bevel gear, and drive the second transmission shaft and the second bevel gear to rotate forward; the third one-way clutch is connected to one lateral swing shaft, and is configured to be driven by the one lateral swing shaft to drive the seventh bevel gear to rotate reversely; the fourth one-way clutch is connected to another lateral swing shaft, and is configured to be driven by the another lateral swing shaft to drive the eighth bevel gear to rotate forward; and the second transmission shaft passes through both the fifth bevel gear and the first bevel gear.

16. The one-way power conversion device according to claim 15, wherein the lateral swing shaft is in the form of two sub-shafts with the same axis that are respectively mounted at left and right sides of the swing box; or, the lateral swing shaft is in the form of one shaft for a single ended input that is mounted at a side of the swing box.

17. A power system, comprising one or a plurality of one-way power conversion devices according to claim 1; wherein, the plurality of one-way power conversion devices share the one-way power gearbox, the swing rotation component, the first transmission shaft, and the second transmission shaft; the one-way power gearbox is connected end to end with the swing rotation component as a whole; and the plurality of one-way power conversion devices, by a series connection, share the swing rotation component to connect to the unstable power source, and share a power output shaft to cooperatively drive a load.

18. The power system according to claim 17, wherein the power system comprises: a first one-way power conversion device and a second single-way power conversion device; wherein, a swing box of the first one-way power conversion device and a one-way power gearbox of the second single-way power conversion device are combined as a whole and share one gearbox, which swings horizontally with an unstable power source; a swing rotation component of the second one-way power conversion device has functions of longitudinal swing and lateral swing; and the second one-way power conversion device and the first one-way power conversion device are formed into a one-way power combination with at least three swing directions.

19. The power system according to claim 18, wherein, a second bevel gear or a third bevel gear of the second one-way power conversion device is connected to a seventh bevel gear or a sixth bevel gear of the first one-way power conversion device; and a one-way clutch for reverse transmission and a one-way clutch for forward transmission are mounted on each swing direction axis of the power system; wherein the one-way clutch for reverse transmission is mounted between transmission components rotating reversely, and the one-way clutch for forward transmission is mounted between transmission components rotating forward.

\* \* \* \* \*